US008375096B2

(12) United States Patent
Carlson et al.

(10) Patent No.: US 8,375,096 B2
(45) Date of Patent: Feb. 12, 2013

(54) ALERTS LIFE CYCLE

(75) Inventors: Mark Carlson, Half Moon Bay, CA (US); Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 194 days.

(21) Appl. No.: 12/759,079

(22) Filed: Apr. 13, 2010

(65) Prior Publication Data

US 2010/0272114 A1 Oct. 28, 2010

Related U.S. Application Data

(60) Provisional application No. 61/173,371, filed on Apr. 28, 2009.

(51) Int. Cl.
*G06F 15/16* (2006.01)
(52) U.S. Cl. ........ 709/206; 709/203; 709/217; 709/218; 709/219
(58) Field of Classification Search .................... 370/401
See application file for complete search history.

(56) References Cited

U.S. PATENT DOCUMENTS

| | | | | |
|---|---|---|---|---|
| 7,496,628 | B2* | 2/2009 | Arnold et al. ............... | 709/206 |
| 7,844,522 | B2* | 11/2010 | Fong ............................ | 705/35 |
| 7,945,511 | B2* | 5/2011 | O'Brien et al. ............. | 705/39 |
| 2002/0147784 | A1* | 10/2002 | Gold et al. ................... | 709/208 |
| 2003/0212684 | A1* | 11/2003 | Meyer et al. ................ | 707/10 |
| 2004/0225627 | A1 | 11/2004 | Botros et al. | |
| 2004/0230448 | A1* | 11/2004 | Schaich ........................ | 705/1 |
| 2007/0203826 | A1 | 8/2007 | Russell et al. | |
| 2008/0120190 | A1 | 5/2008 | Joao et al. | |
| 2008/0288382 | A1* | 11/2008 | Smith et al. ................. | 705/35 |
| 2009/0172555 | A1* | 7/2009 | Braun et al. ................ | 715/734 |

FOREIGN PATENT DOCUMENTS

| | | |
|---|---|---|
| JP | 2007-199831 A | 8/2007 |
| KR | 10-2001-0000457 A | 1/2001 |
| KR | 10-2004-0022901 A | 3/2004 |
| KR | 10-2005-0031167 A | 4/2005 |
| KR | 10-2006-0008127 A | 1/2006 |

OTHER PUBLICATIONS

The International Search Report for Application No. PCT/US2010/032239, dated Nov. 26, 2010, 5 pages.
The International Written Opinion for Application No. PCT/US2010/032239, dated Nov. 26, 2010, 4 pages.
The International Search Report for Application No. PCT/US2010/032784, dated Dec. 13, 2010, 5 pages.
The International Written Opinion for Application No. PCT/US2010/032784, dated Dec. 13, 2010, 4 pages.

* cited by examiner

*Primary Examiner* — Thu Nguyen
*Assistant Examiner* — Angela Widhalm
(74) *Attorney, Agent, or Firm* — Kilpatrick, Townsend & Stockton LLP (57) ABSTRACT

Server computers and methods for updating or changing user alert message settings when changes are made to one or more user accounts are disclosed. The change in the user accounts can include transfers of a user account or user account identifier from one user account issuer to another user account issuer. The change in user accounts can be initiated by a user or issuer associated with the user account. When changes are made to the user accounts or changes are made to the user alert message settings, the server computer can confirm the changes with the user or issuer associated with the user accounts that are changed.

20 Claims, 5 Drawing Sheets

ALERTS LIFE CYCLE

CROSS-REFERENCES TO RELATED APPLICATIONS

This application claims priority to U.S. Provisional Patent Application No. 61/173,371, entitled Alerts Based System and Method, filed Apr. 28, 2009 and is incorporated by reference herein in its entirety for all purposes.

BACKGROUND

There are many occasions where a user may want to be notified when his or her credit card or other user account is used, accessed, changed or otherwise altered. For example, a user may want to know when a credit card account has been used to purchase a large screen television for $5000 on the Internet, when a debit card account number is used outside the U.S. to purchase airplane tickets, when his mobile telephone was used to make toll calls or purchases or when a child account user uses the child account to purchase alcohol.

A user may also wish to receive an alert from the account issuer (i.e. a credit card issuer or mobile phone service provider) when the account issuer determines potentially fraudulent activity has occurred in relation to the user's account. The account issuer may contact the user using the contact information it has on file for the user, which is typically a user's phone number, email address and home address. For example, the issuer may call the user at his mobile phone number or send a letter to his home address informing the user that potentially fraudulent or unauthorized activity has been detected. The manner in which a user is alerted can be highly customized according to specific preferences or policies of the user or the account issuer.

A user may wish to receive alerts about his or her credit card accounts being used via an SMS messages sent to his or her mobile telephone, but might rather receive alerts regarding purchases made using one of the mobile phones on his or her mobile telephone service account via a telephone call or SMS message to the primary telephone number on the account. That same user may have several account specific preferences for receiving alerts regarding those accounts depending on account type, transaction amount, transaction type or the time period, the location and style of transaction. Setting up such user and account specific alert preferences can be very time consuming or difficult to reproduce whenever a user makes a change to one or more of his or her user accounts.

For example, a user may change mobile telephone service provider, thereby setting up a new mobile telephone account with that that mobile telephone service provider, but would like to maintain the same terms, conditions and methods of delivery for receiving alerts for the telephone number that is transferred to the new mobile telephone service provider. Similarly, a user may change banks and receive a new credit card account to replace an old household expense credit card account and would like the alert preferences to remain the same as those previously setup with respect to the old household expense credit card. To keep the same alert message settings for the new user accounts, a user would have to submit all of his or her alert message settings to the new mobile telephone service provider and bank. Even if this process was available to the user via online in a website using pull down menus and other convenient user interface features, it would still take the user some amount of time to recall and enter all of his or her preferred user alert message settings. This process is further exasperated if a user has forgotten his particular preferred setting or has a particularly complicated set of user alert message settings.

Furthermore, predefined or issuer specific user alert message settings can vary drastically from one user account issuer to another, thus making it difficult for a user to keep the exact set of user alert message settings to which he or she prefers or has grown accustomed when the user changes user account issuers or opens up a new user account with a new user account issuer. For example, one user account issuer may allow a user to define a threshold amount for all transaction types to trigger a user alert message while another may allow a user to define a different threshold amount for different transaction types categories. As such, it would be difficult for the user or the issuer to translate the user's alert message settings from the later user account issuer to the former.

Embodiments of the present invention address these and other issues individually and collectively.

BRIEF SUMMARY

Embodiments of the present invention are directed to methods for transferring user alert message settings in a transaction processing system. The method comprises receiving a user account change notification message over a communication interface, parsing the user account change notification message to determine a user identifier and a user account update information. The user identifier can be related to one or more user accounts and the user account update information can include changes to the user accounts. A user alert message settings inquiry message is sent to the user alert message settings database and in response a user alert message settings response message is received from the user alert message settings database over the communication interface. The user alert message settings response message is parsed to determine a set of user alert message settings corresponding to the user identifier which can then be used to modify the set of user alert message settings according to the changes to the user accounts using the processor. Other embodiments include saving the modified set of user alert message settings to the user alert message settings database using the processor.

Other embodiments of the present invention are directed to a communication/IP gateway computer for updating user alert message settings and implementing the method for transferring user alert message settings in a transaction processing system. The communication/IP gateway computer can include a processor and a user alert message settings database. The processor can be configured to receive a user account change notification message over a communication interface and parse the user account change notification message to determine a user identifier and a set user account update information. The user identifier can be related to one or more user accounts and the user account update information can include changes to the user accounts.

The processor of the communication/IP gateway computer can also be configured to send a user alert message settings inquiry message to the user alert message settings database and, in response, receive a user alert message settings response message from the user alert message settings database. The communication/IP gateway computer can then parse the user alert message settings response message to determine a set of user alert message settings corresponding to the user identifier which is then used to modify the set of user alert message settings according to the changes to the user accounts. The communication/IP gateway computer can also be configured to save the modified set of user alert message settings to the user alert message settings database.

DETAILED DESCRIPTION

Embodiments of the present invention are directed to systems and methods for transferring user alert message settings from one user account to another, either automatically or upon a prompted or unprompted request of a user or a user account issuer, to better maintain users' alert message settings based on account type, time period, transaction type, transaction location, etc. Various embodiments of the present invention alleviate the need for a user or an account issuer to manually setup user alert message settings each time a new account is opened with or transferred to a new user account issuer or the classification of an existing user account is changed. Services utilizing various embodiments of the present invention can be directed towards individual users or groups of users, such as corporations or other entities, as well as account issuers that may wish to offer the user alert message setting transfer service to their own customers. Embodiments of the present invention will be described in more detail in reference to specific examples and figures herein.

Figure 1:
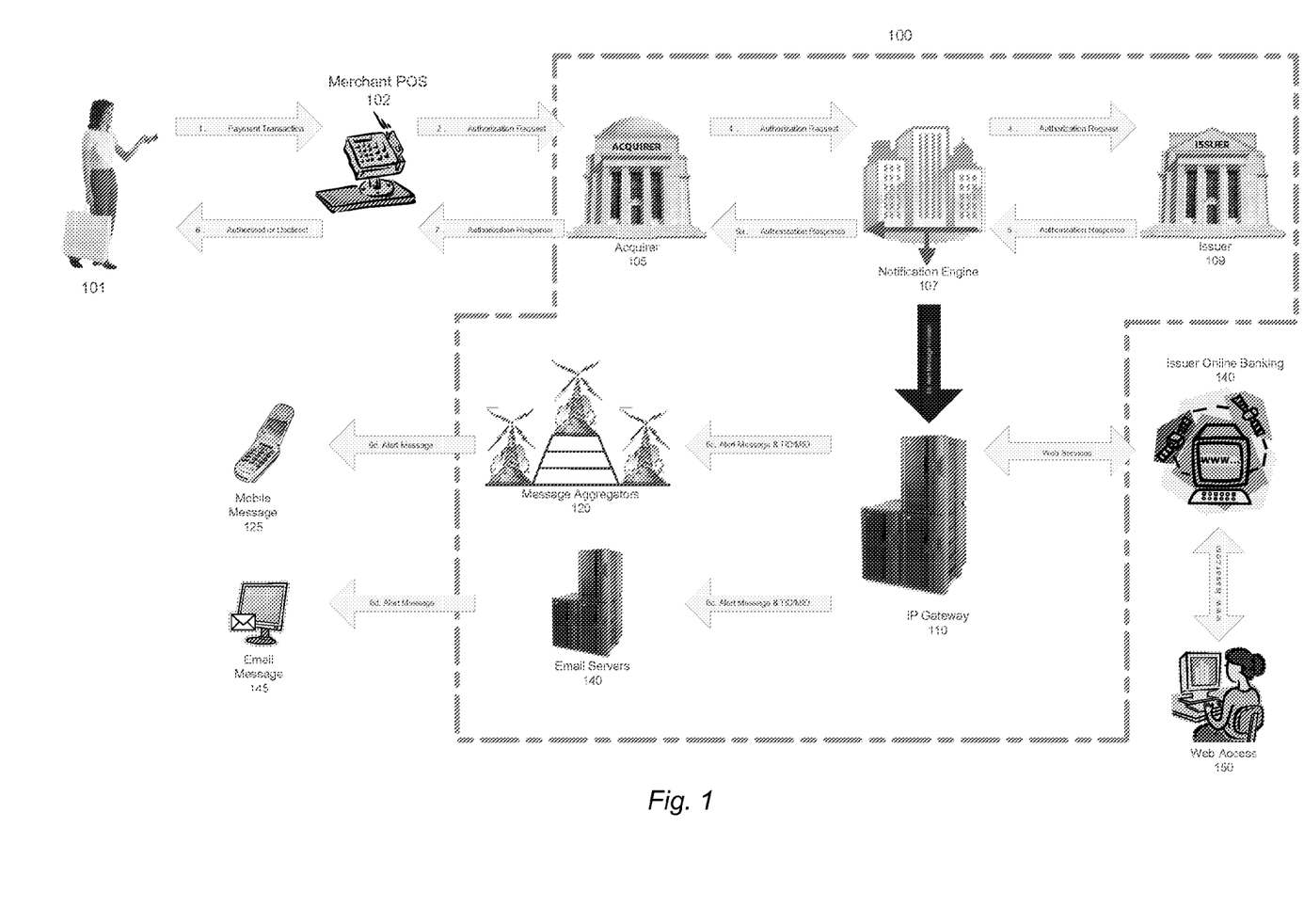
FIG. 1 is a schematic of a system for delivering user alerts in which various embodiments of the present invention can be employed.

FIG. 1 is a schematic diagram of a system 100 that can include and be improved by various embodiments of the present invention. The description of system 100 is provided to give context in which various embodiments of the present invention can be used. The transaction processing system 100 can use many forms of user tokens to initiate various forms of transactions including, but not limited to, credit card transactions, debit card transactions, mobile telephone initiated transactions such as telephone calls, etc. In other embodiments, users can initiate transactions from a computer either by logging into an authorized website which has the ability to initiate a transaction from particular account, i.e. PayPal™, Google Checkout™ or the like, or by a user entering account information from memory for a "token-not-present" transaction. Regardless of the method in which the transaction from a particular account is initiated, various embodiments of the present invention can be used to establish, track or transfer user alert preferences from one account to another.

The transaction processing system 100 is an example of a system that can be used to process user transactions and then selectively send user alert message to one or more users based on information regarding the transactions. User 101 can initiate a transaction or other account activity, such as a credit card transaction in step 1. The transaction can be initiated with a point-of-sale (POS) terminal, such as a credit card terminal, a computer, a PDA or a mobile telephone. Once the transaction is initiated, an authorization request message can be sent to an entity holding or maintaining the payee or payer user accounts or both, such as an account acquirer 105 in step 2. Acquirer 105 can reformat the authorization request message into its own authorization request message and send that message to a notification engine 107 in step 3. In other embodiments, acquirer 105 can simply pass on the authorization request message it receives from the POS terminal 102 in step 2. Notification engine 107 can pass on the authorization request message from acquirer 105 and POS terminal 102 to issuer 109 for further authorization and authentication in step 4. Once issuer 109 authenticates or authorizes the transaction or other activity requested in the authorization request message, issuer 109 can send an authorization response to the notification engine 107 in step 5. Once notification engine 107 receives the authorization response message, the process can be bifurcated. In step 6a, notification engine 107 can send an authorization response message to acquirer 105, which in turn can provide an authorization response message to the POS terminal 102 in step 7. In step 8, POS terminal 102 can then inform user 101 or a merchant as to whether the requested transaction or other activity is authorized or declined based on the authorization response message.

Meanwhile, in step 6b, notification engine 107 can send a user alert message initiation request to communication/IP gateway, such as Internet Protocol Gateway (IPG) 110. IPG 110 can use the alert message initiation request from the notification engine 107 to generate an alert message. In some embodiments, IPG 110 can parse out a transaction identifier (TID) or a message identifier (MID) from the alert message initiation request. In other embodiments, IPG 110 can generate a TID or an MID. In either case, IPG 110 can associate each alert message generated with an identifier, such as a TID or an MID.

IPG 110 can then route the alert message and the associated MID to one or more message aggregators 120 or e-mail servers 130 in step 6c. The aggregator to which the alert message and the MID are sent can be based on information contained a user alert message settings file or in the alert message initiation request and information regarding the message aggregators contained in a routing table. For example, the alert message initiation request, which can be based on a set of user or issuer defined alert message settings, can request that an alert message be sent out via a Simple Message Service (SMS) protocol, Multimedia Messaging Service (MMS) protocol, e-mail or any other messaging service suitable for delivering high-volume messages quickly, efficiently and reliably. Embodiments in which the alert message initiation request specifies a specific delivery protocol, the IPG 110 can refer to a routing table to determine which message aggregator offers the appropriate delivery protocol. Additionally, the IPG 110 can refer to the routing table to determine other pertinent characteristics and information regarding each available message aggregator or mobile carrier 120 or e-mail server 130.

Embodiments in which message aggregators 120 can route user alert messages to one or more mobile communications service providers, such as mobile telephone service providers, message aggregators 120 can format the messages as one or more text, SMS, MMS or other mobile device compatible messages. At step 6d, the mobile communication carriers can send the mobile compatible messages to one or more mobile devices associated with user 101, a business or a representative of the business. In some embodiments, the mobile device 125 can be a cellular telephone, smart phone, a pager, a two-way-pager or other mobile user device suitable for receiving wireless alert messages.

In other embodiments, IPG 110 can route the user alert message and MID to e-mail servers 130 in step 6c. In such embodiments, e-mail servers 130 can then route an e-mail message to an e-mail compatible device 135. E-mail compatible device 135 can be a personal computer, a laptop computer, desktop computer, a tablet computer, a smart phone, an e-mail capable mobile telephone or any other e-mail device capable of receiving e-mail.

Figure 2:
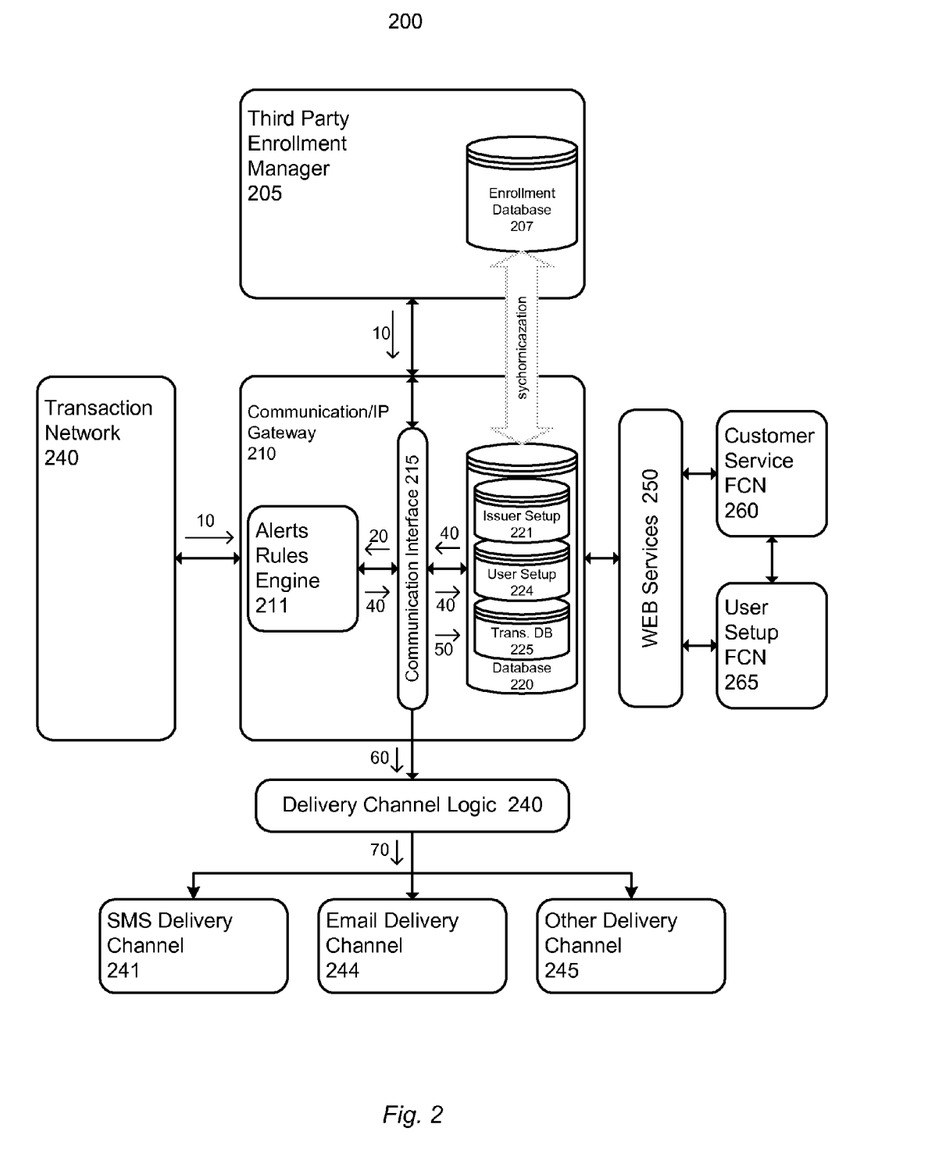
FIG. 2 is a schematic of a system for transferring user alert message settings from one account to another.

Systems and methods for transferring user alert message settings according to various embodiments of the present invention will now be described. FIG. 2 is a schematic of a system 200 for transferring user alert message settings from one user account to another. FIG. 2 also shows the data flow of a method of using the system 200 for transferring user alert message settings from user account to another. In FIG. 2, communication/IP gateway 210 is analogous to IPG 110 in FIG. 1.

As previously mentioned, IPG 110 or communication/IP gateway 210 can route a user alert message to one or more message aggregators 120 or e-mail servers 130 to be delivered to a user via the delivery method preferred by the user or the account issuer according to a set of user alert message settings.

According to various embodiments of the present invention, communication/IP gateway 210 can receive a user account change notification message in step 10. The user account change notification message can come from transaction network 240 or a third-party enrollment manager 205.

In some embodiments, transaction network 240 can include various portions of transaction processing system 100. For example transaction network 240 can be an acquirer 105, a notification engine 107, an issuer 109, an online banking website 140 or any combination thereof. When the user account change notification message originates from a website or a customer service center, such data can be handled by WEB services 250, customer service function 260 or user setup function 265. The Communication/IP gateway 210 can also receive the user account change notification message from a third-party enrollment manager 205. Regardless of the source from which communication/IP gateway 210 receives a user account change notification message in step 10, communication/IP gateway 210 can take appropriate steps to ensure that the user alert message settings are transferred from one account to another or updated for a particular user account. The user alert message settings can be transferred automatically without user or issuer intervention.

Communication/IP gateway 210 can receive the user accounts change notification message over one or more communication channels such as communication interface 215. Communication interface 215 can provide electronic communication between communication/IP gateway 210 and external components, networks or systems and may also provide electronic communication between the internal components of communication/IP gateway 210. For example, communication interface 215 can provide electronic communication between alerts rules engine 211 and database 220. In such embodiments, communication/IP gateway 210 can parse the user account change notification message to determine a user ID or a set of account update information in step 20 using alerts rules engine 211. In various embodiments, alerts rules engine 211, communication/IP gateway 210 and database 220 can be incorporated into a single computer or server computer or can be embodied in separate computers or server computers.

The user account change notification message can include a user ID, one or more sets of user account update information, new user account update information, closed or canceled user account information or user alert message setting changes. Additionally, the user account change notification message can include a record identifier/pointer to a user alert message setting file associated with the user ID stored in one or more databases such as database 220 or enrollment database 207. The data in the user account change notification message can be organized in any manner suitable for efficient storage and communication of the user account change notification message. For example, user account change notification message can be the form of a tab or comma delimited text file, a concatenated data string with appropriate start and stop indicators, etc.

The information in the user account change notification message can be parsed to determine various components and information contained in the user account change notification message. Using this information, such as a user ID, alerts rules engine 211 can send a user alert message settings inquiry message to one or more databases, such as database 220 in step 30. Database 220 can include and manage individual or related internal databases such as issuer setup database 221, user setup database 223 and transaction database 225. Database 220, and the other internal databases, can be synchronized with an external enrollment database 207 managed by a third-party enrollment manager 225. External enrollment database 207 can include user or issuer alert message settings defined at the time, or sometime thereafter, a user enrolls in a user alert message program. Alternatively, enrollment database 207 can include default user or issuer user alert message settings that have been determined to be suitable for most users and issuers. The degree of suitability for most users and issuers of the default user/issuer account alert message settings can depend on the specifics of user accounts and transactions enrolled in the user alert message program. The synchronization between enrollment database 207 and database 220 can occur in real time or in batches completed during some settlement period determined by the third-party enrollment manager 205 or communication/IP gateway 210.

In response to the user alert message settings inquiry message received from the alerts rules engine 211, database 225 can return the user alert message settings response message in step 40. In other embodiments, the database 225 can return data sufficient to create the user alert message settings response message in step 40. The user alert message settings response message can include one or more user alert message settings files or a single user alert message settings file that defines the user or issuer defined user alert message settings for one or more user accounts. The file structure of the user alert message settings response message can be any file format compatible and readable by alerts rules engine 211 as described above. Alerts rules engine 211 can receive the user alert message settings response message, and can parse the user alert message settings response message to determine a set of user alert message settings. Alerts rules engine 211 can compare the user alert message settings contained in the user alert message settings response message to the set of user alert message settings within the account update information. Alerts rules engine 211 can determine which settings for which accounts need to be modified. Alerts rules engine 211 can then make the necessary modifications to the set of user alert message settings with the account update information which are determined to be modified.

In step 50, alerts rules engine 211 can save the modified set of user alert message settings to database 220 or any of the internal databases such as issuer setup database 221, user setup database 223 or transaction database 225. In some embodiments, communication/IP gateway 210 can also send the updated or modified set of user alert message settings to one or more delivery channels via delivery channel logic 230 in step 60. Furthermore, the delivery channel logic 230 can determine which of the relevant delivery channels, if any, designated in the modified user alert message settings need to receive the modified set of user alert message settings. For example, delivery channel logic 230 can determine that a mobile telephone number used to receive SMS delivered user alert messages has changed and therefore only SMS delivery channel 231 may need to be informed and/or updated in step 70. Similarly, delivery channel logic 230 can determine the primary e-mail address used to send user alert e-mail messages has changed and determine to route the modified set of user alert message settings account update information to e-mail delivery channel 233 in step 70. Delivery channel logic 230 can also determine to send the modified set of user alert message settings with the account update information to some other delivery channel 235 depending on information changed or updated in the modified set of user alert message settings in step 70.

In various embodiments, the same channels preferred by the user or issuer to deliver user account alert messages to one or more users can also be used to notify the user when one or more of the user alert message settings have been modified by the system 200. For example, if the user has previously setup his user alerts regarding user accounts X, Y and Z to deliver user alert messages to his or her smart phone, the communication/IP gateway 210 or alerts rules engine 211 can send a confirmation e-mail or SMS message to the user's smart phone whenever a change to the user defined user alert message settings has been detected, attempted or completed. The confirmation message sent by communication/IP gateway 210 or alerts rules engine 211 can include a response address, such as an e-mail address, a response telephone number or an interactive website link (i.e. hyperlink) for the user to confirm or refute any changes to the user alert message settings associated with the confirmation message.

Figure 3A:
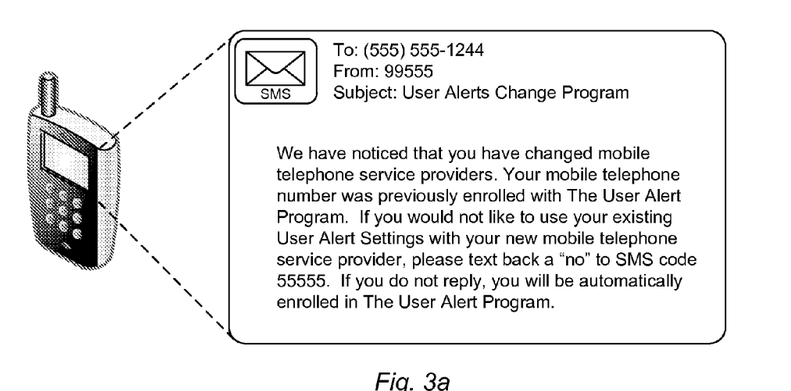
FIGS. 3a, 3b and 3c are examples of confirmation messages that can be sent to a user to confirm transfer of user alert message settings.
Figure 3B:
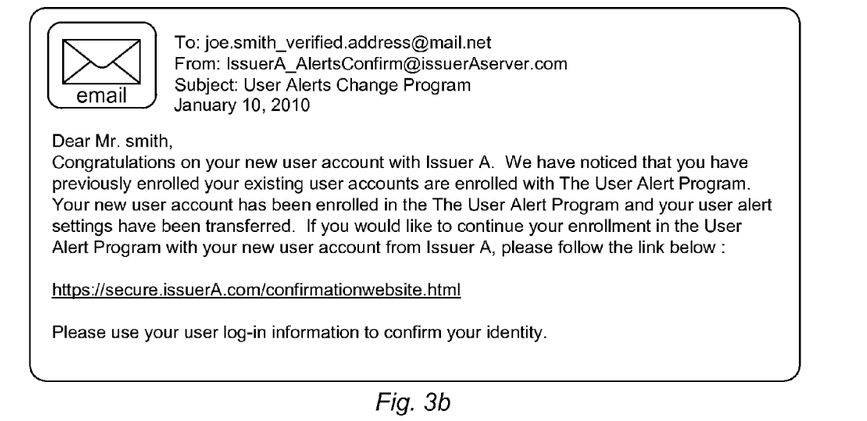
Figure 3C:
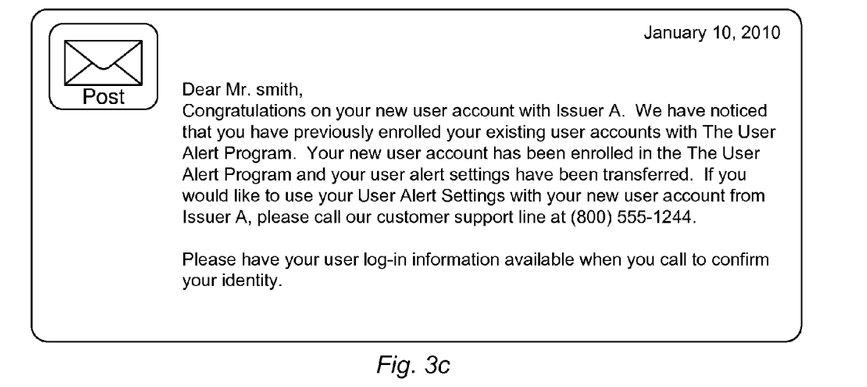

FIGS. 3a, 3b and 3c show examples of confirmation messages that can be sent to one or more users when a user account is changed, transferred to a new issuer or recently opened and/or when user alert message settings from one user account are transferred or applied to another user account. As shown in FIG. 3a, a confirmation message sent via SMS message protocols can prompt a user to either send an appropriate response to a response address, i.e. if the confirmation message is sent by SMS message, the user can simply respond with a "yes" or "no" message to one or more response telephone numbers or response code numbers contained in the confirmation message. FIG. 3b shows an example of another embodiment in which a user can sent an email and be prompted to visit a website to confirm or refute the changes made to the user alert message settings or the application of the user alert message settings to a user account which was previously not covered by user alert messages. Similarly, the user may be asked reply to an e-mail or send an e-mail to another address in the event that the confirmation message is sent via an e-mail delivery channel such as e-mail delivery channel 233. Various other forms of confirmation or responses to the confirmation message can be used to confirm or refute whether or not an authorized or unauthorized user, issuer or third party has made changes to the user alert message settings associated with the user, user ID or an associated user account or the issuer thereof. For example, FIG. 3c shows a confirmation letter sent to a user via traditional paper-based postal service.

In all such embodiments, the user can have control over whether or not a particular user alert message setting can be modified, thereby avoiding possible attempts at fraud on the user or the issuer by unauthorized disablement of user alert message that would otherwise alert a user or issuer to potential fraud or other suspicious or unauthorized activity. Although confirmation messages can be sent to the user, the transfer of user alert message settings from one account to another can also be handled automatically without requiring user or issuer initiation or intervention. This provides the advantage of quickly and seamlessly providing user alert message coverage and security to issuers and users with minimal effort, cost and delay.

Figure 4:
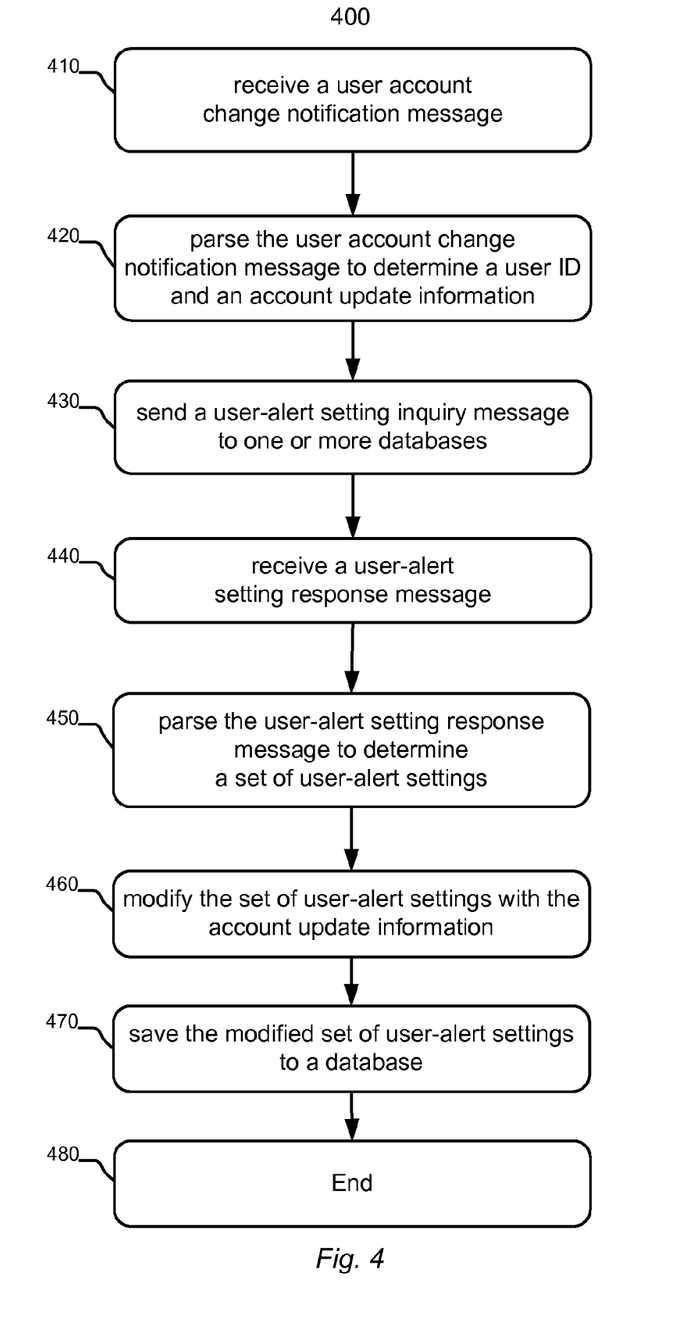
FIG. 4 is a flowchart of a method for transferring user alert message settings from one account to another.

FIG. 4 is a flowchart of a method 400 for updating user alert message settings and/or transferring user alert message settings from one user account to another. The steps described in method 400 can be initiated when a user either makes changes to his or her user alert message settings or opens a new user account. Similarly, the steps of method 400 can also be initiated when an issuer either makes changes to user alert message settings or opens a new user account. Opening a new user account can include a user or issuer transferring his or her user account to another issuer. For example, a user can transfer his mobile telephone number from one mobile telephone service provider to another mobile telephone service provider. Even though the telephone number can be the same, the account and the mobile telephone service provider will be different. In such embodiments, either the user or the user account issuer can send a user account change notification message to communication/IP gateway 210 or alerts rules engine 211. In some cases, the mobile telephone service provider can send a user account change notification message, while in other cases the user will need to initiate sending a user account change notification message. In the case in which a user initiates sending the user account change notification message, the user can initiate the user account change notification message using a website, an automated or manned telephone system, use SMS-based messages or send a paper-based message to a service provider who will initiate the user account change notification message on the user's behalf.

The user account change notification message can be sent by any suitable electronic communication medium capable of encoding, transmitting and decoding electronic information, such as wireless communication protocols, wired communication protocols, the Internet or other proprietary and standardized electronic communication protocols. In step 410 the communication/IP gateway 210, alerts rules engine 211 or some other server computer can receive a user account change notification message from one or more sources. As used herein, the terms the communication/IP gateway 210, alerts rules engine 211 and server computer can refer to any computer system having an appropriate processor, memory, network interface, user interface and storage device capable of receiving a user account change notification messages over one or more types of electronic communication media.

In step 420, a server computer can parse the user account change notification message to determine a user ID and a set of account update information.

The user account change notification message can be a binary or ASCII file. In addition, the user account change notification message can have any suitable data format, such as a concatenated binary file or a comma/tab limited text file. The user account change notification message can be in any file format suitable for being parsed by a server computer.

In some embodiments the set of account update information can include changes to the user defined user alert message settings, changes to the user accounts and/or changes to the issuers of one or more user accounts associated with a particular user or user ID. In step 430 server computer can send a user alert message setting inquiry message to one or more databases. The user alert message settings inquiry message can include the user ID, a user account identifier and or a user account settings identifier.

User alert message settings inquiry message can be sent by the communication/IP gateway 210 or rules alerts engine 211 to either an internal or an external database containing one or more user alert message settings defined for an associated user or issuer. In response to the user alert message settings inquiry message, the server computer can receive a user alert message settings response message in step 440. The user alert message settings response message can include any or all user alert message settings for one or more user accounts associated with the user or the user ID contained in the user alert message settings inquiry message. The user alert message settings can include user preferences and specifications defined by the user, the user account issuer or a third party enrollment manager.

In step 450, the server computer, communication/IP gateway 210 or alerts rules engine 211 can parse the user alert message settings response message to determine a set of user alert message settings. In some embodiments the server computer can compare the set of user alert message settings parsed from the user alert message settings response message with the account update information parsed from the user account change notification message to determine if a server computer needs to modify the user alert message settings. In step 460, server computer, communication/IP getaway 210 or alerts rules engine 211 can modify the set of user alert message settings in the account update information if necessary. Finally, in step 470, the server computer can save the modified set of user alert message settings to one or more databases. At this point, alerts can be sent to users whenever a triggering event is detected using the settings and preferences in the user alert message settings in the databases.

Figure 5:
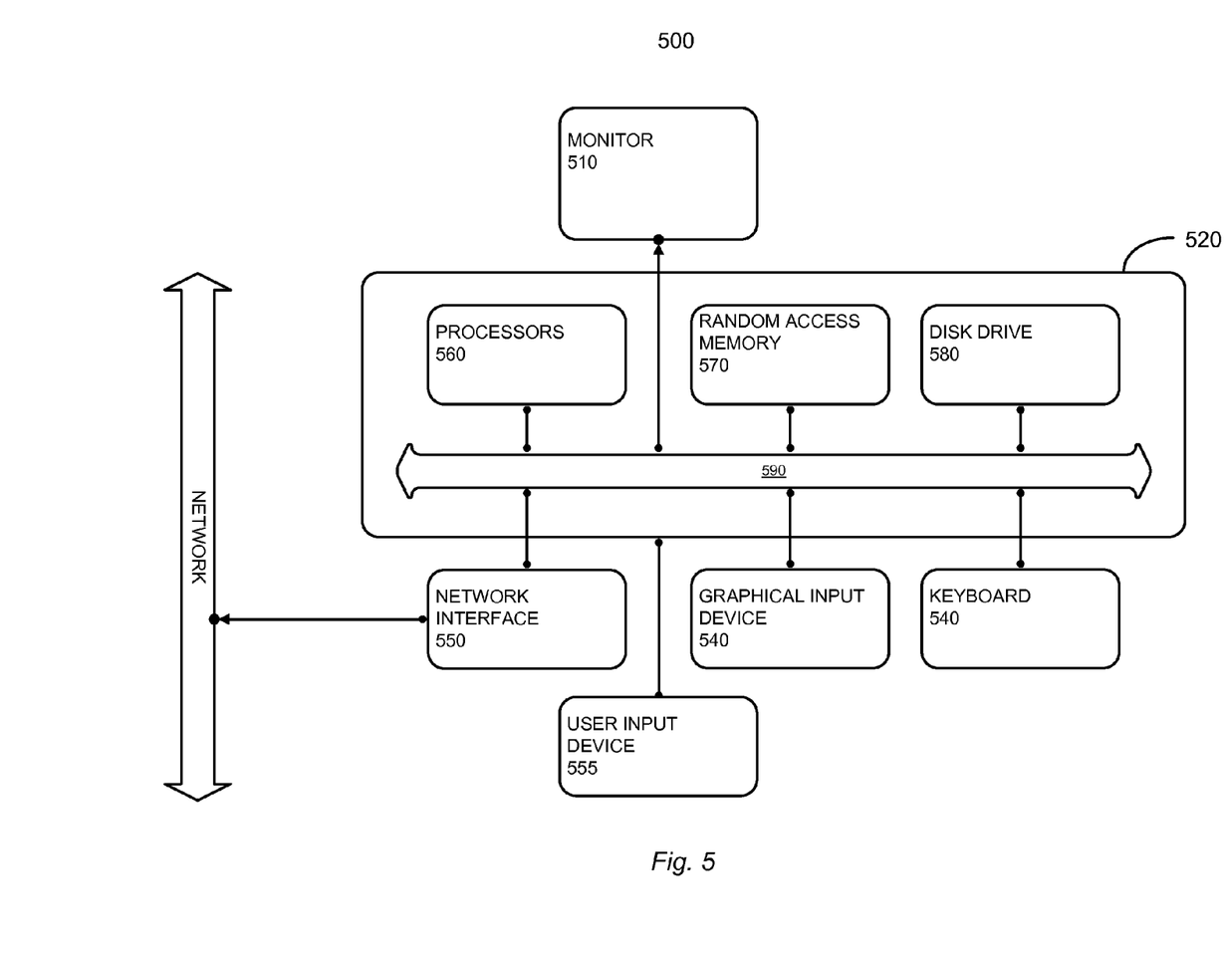
FIG. 5 is a schematic of a computer system that can be used to implement various embodiments of the present invention.

FIG. 5 is a block diagram of typical computer system 500 configured to execute computer readable code to implement various functions and steps according to various embodiments of the present invention.

System 500 is representative of a computer system capable of embodying the present invention. The computer system can be present in any of the elements in FIGS. 1 and 2, including the IPG 110, communication/IP gateway 210 and rules alerts engine 211 described above. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™ Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 500 typically includes a display 510, computer 520, a keyboard 530, a user input device 540, communication or network interface 550, and the like. In various embodiments, display (monitor) 510 may be embodied as a CRT display, an LCD display, a plasma display, a direct-projection or rear-projection DLP, a microdisplay, or the like. In various embodiments, display 510 may be used to display user interfaces and rendered images.

In various embodiments, user input device 540 is typically embodied as a computer mouse, a trackball, a track pad, a joystick, wireless remote, drawing tablet, voice command system, and the like. User input device 540 typically allows a user to select objects, icons, text and the like that appear on the display 510 via a command such as a click of a button or the like. An additional specialized user input device 545, such a magnetic stripe, RFID transceiver or smart card reader may also be provided in various embodiments. In other embodiments, user input device 545 include additional computer system displays (e.g. multiple monitors). Further user input device 545 may be implemented as one or more graphical user interfaces on such a display.

Embodiments of computer interfaces 550 typically include an Ethernet card, a modem (telephone, satellite, cable, ISDN), (asynchronous) digital subscriber line (DSL) unit, FireWire interface, USB interface, and the like. For example, computer interfaces 550 may be coupled to a computer network, to a FireWire bus, or the like. In other embodiments, computer interfaces 550 may be physically integrated on the motherboard of computer 520, may be a software program, such as soft DSL, or the like.

RAM 570 and disk drive 580 are examples of computer-readable tangible media configured to store data such user, account and transaction level data, calculated aggregated data, super keys, sub keys and other executable computer code, human readable code, or the like. Other types of tangible media include magnetic storage media such as floppy disks, networked hard disks or removable hard disks; optical storage media such as CD-ROMS, DVDs, holographic memories or bar codes; semiconductor media such as flash memories, read-only-memories (ROMS); battery-backed volatile memories; networked storage devices, and the like.

In the present embodiment, computer system 500 may also include software that enables communications over a network such as the HTTP, TCP/IP, RTP/RTSP protocols and the like. In alternative embodiments of the present invention, other communications software and transfer protocols may also be used, for example IPX, UDP or the like.

In various embodiments, computer 520 typically includes familiar computer components such as a processor 560, and memory storage devices, such as a random access memory (RAM) 570, disk drives 580, and system bus 590 interconnecting the above components.

In some embodiments, computer 500 includes one or more Xeon microprocessors from Intel. Further, in the present embodiment, computer 520 typically includes a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for transferring user alert message settings in a transaction processing system, the method comprising:
   receiving a user account change notification message over a communication interface;
   transferring user alert message settings from a first user account to a second user account according to the user account change notification, wherein transferring includes
      parsing by a processor in a server computer the user account change notification message to determine a user identifier and a user account update information, the user identifier being related to one or more user accounts and the user account update information including changes to the user accounts associated with the first user account,
      sending a user alert message settings inquiry message to a user alert message settings database using the processor,
      receiving a user alert message settings response message from the user alert message settings database over the communication interface using the processor wherein the user alerts message settings response message includes a plurality of user alerts message settings files, and wherein each of the plurality of user alerts message settings files defines user alerts message settings for a different user account,
      parsing the user alert message settings response message to determine a set of user alert message settings associated with the second user account corresponding to the user identifier using the processor,
      comparing the set of user alert message settings to the changes to the user accounts to determine which settings are to be modified, and
      modifying the set of user alert message settings according to the changes to the user accounts using the processor.

2. The method of claim 1 further comprising saving the modified set of user alert message settings to the user alert message settings database using the processor.

3. The method of claim 1 further comprising using the processor to confirm the user account update information with a user associated with the user identifier or a user account issuer.

4. The method of claim 3 wherein using the processor to confirm the user account update information further comprises sending a response address to the user with a request for the user to respond to confirm the user account update information.

5. The method of claim 4 wherein the response address comprises a website.

6. The method of claim 4 wherein the response address comprises a mobile telephone number or code.

7. The method of claim 4 wherein the response address comprises an email address.

8. The method of claim 1 wherein the changes to the user accounts comprises a transfer of an account or account identifier from a first user account issuer to a second user account issuer.

9. The method of claim 8 wherein the transfer of an account of account identifier from the first user account issuer to the second user account issuer comprises moving a mobile telephone number from a first mobile telephone service provider to a second mobile telephone service provider.

10. The method of claim 1 wherein the user accounts include accounts selected from a group consisting of mobile phone accounts, email accounts, transaction accounts, social network accounts and utility accounts.

11. A communication/IP gateway computer for updating user alert message settings comprising:
    a processor; and
    a user alert message settings database;
    wherein the processor is configured to receive a user account change notification message over a communication interface and to transfer user alert message settings from a first user account to a second user account according to the user account change notification, and
    wherein to transfer the user alert message settings, the processor is further configured to
       parse the user account change notification message to determine a user identifier and a user account update information, the user identifier being related to one or more user accounts and the user account update information including changes to the user accounts associated with the first user account, and
       send a user alert message settings inquiry message to the user alert message settings database,
       receive a user alert message settings response message from the user alert message settings database wherein the user alerts message settings response message includes a plurality of user alerts message settings files, and wherein each of the plurality of user alerts message settings files defines user alerts message settings for a different user account,
       parse the user alert message settings response message to determine a set of user alert message settings associated with the second user account corresponding to the user identifier,
       compare the set of user alert message settings to the changes to the user accounts to determine which settings are to be modified, and
       modify the set of user alert message settings according to the changes to the user accounts.

12. The communication/IP gateway computer of claim 11 wherein the processor is further configured to save the modified set of user alert message settings to the user alert message settings database.

13. The communication/IP gateway computer of claim 12 wherein the user alert message settings database comprises a plurality of databases.

14. The communication/IP gateway computer of claim 13 wherein the plurality of databases comprises an issuer setup database, a user setup database and a transaction database.

15. The communication/IP gateway computer of claim 11 wherein the user alert message settings database synchronizes with an external enrollment database.

16. The communication/IP gateway computer of claim 15 wherein the external enrollment database is maintained by a third party enrollment manager.

17. The communication/IP gateway of claim 11 wherein an alerts rules engine is configured to verify the user account update information with a user related to the user identifier or an account issuer related to a user account associated with the user.

18. The method of claim 1, further comprising:
sending a confirmation message to a user associated with the first and second user accounts when the user alert message settings have been modified; and
receiving a response from the user confirming the modified user alert message settings.

19. The method of claim 1, further comprising:
sending the modified set of user alert message settings to a delivery channel logic, wherein the delivery channel logic can identify one or more delivery channels to update and send the modified set of user alert messages to the one or more delivery channels.

20. The method of claim 19 wherein the one or more delivery channels can include an SMS delivery channel and an email delivery channel.

* * * * *